US009756584B2

(12) United States Patent
Konuskan et al.

(10) Patent No.: US 9,756,584 B2
(45) Date of Patent: *Sep. 5, 2017

(54) SETTING INITIAL TRANSMISSION POWER FOR A SECONDARY CARRIER AFTER A TRANSMISSION GAP

(71) Applicant: Telefonaktiebolaget LM Ericsson (publ), Stockholm (SE)

(72) Inventors: Cagatay Konuskan, Oslo (NO); Billy Hogan, Sollentuna (SE); Ari Kangas, Lidingö (SE); Göran Kronquist, Gråbo (SE); Waikwok Kwong, Solna (SE); Gerardo Agni Medina Acosta, Järfälla (SE); Hongxia Zhao, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/360,380

(22) Filed: Nov. 23, 2016

(65) Prior Publication Data

US 2017/0078982 A1 Mar. 16, 2017

Related U.S. Application Data

(63) Continuation of application No. 14/767,831, filed as application No. PCT/SE2015/050326 on Mar. 19, 2015, now Pat. No. 9,538,480.

(Continued)

(51) Int. Cl.
*H04W 52/16* (2009.01)
*H04W 52/32* (2009.01)
(Continued)

(52) U.S. Cl.
CPC ..... *H04W 52/325* (2013.01); *H04W 52/0216* (2013.01); *H04W 52/16* (2013.01);
(Continued)

(58) Field of Classification Search
CPC ... H04W 52/16; H04W 52/325; H04W 52/04; H04W 52/241; H04W 72/04; H04W 52/386; H04W 72/0453
(Continued)

(56) References Cited

U.S. PATENT DOCUMENTS

2009/0213748 A1 8/2009 Vanganuru et al.
2010/0157895 A1 6/2010 Pani et al.
(Continued)

FOREIGN PATENT DOCUMENTS

WO 2009157836 A1 12/2009
WO 2014088495 A1 6/2014
WO 2014112942 A1 7/2014

OTHER PUBLICATIONS

3GPP TSG-RAN #62, Busan, Korea, RP-132078, Source: Ericsson, Title: "New Work Item Proposal: Further EUL Enhancements—Performance", Document for: Approval, Agenda Item: 13.1.2, rev 10, Dec. 3-6, 2013 consisting of pp. 7-pages.
(Continued)

*Primary Examiner* — Keith Ferguson
(74) *Attorney, Agent, or Firm* — Christopher & Weisberg, P.A.

(57) ABSTRACT

A method and system for setting an initial dedicated physical control channel (DPCCH) power of a secondary carrier after a transmission gap are disclosed. According to one aspect, a method includes determining a filtered DPCCH power of first carrier. The method further includes determining a power offset. The method also includes calculating the initial DPCCH power of the secondary carrier by adding the determined filtered DPCCH power of the first carrier to the determined power offset.

23 Claims, 6 Drawing Sheets

Related U.S. Application Data

(60) Provisional application No. 61/968,947, filed on Mar. 21, 2014.

(51) Int. Cl.
  *H04W 52/24* (2009.01)
  *H04W 52/50* (2009.01)
  *H04W 52/02* (2009.01)
  *H04W 52/26* (2009.01)

(52) U.S. Cl.
  CPC ....... *H04W 52/241* (2013.01); *H04W 52/267* (2013.01); *H04W 52/50* (2013.01); *Y02B 60/50* (2013.01)

(58) Field of Classification Search
  USPC ... 455/522, 69, 68, 67.11, 127.1–127.3, 500, 455/517, 509, 450, 550.1, 507, 515, 455/422.1, 403; 370/328, 329, 318, 252, 370/310
  See application file for complete search history.

(56) References Cited

U.S. PATENT DOCUMENTS

| | | |
|---|---|---|
| 2010/0309833 A1 | 12/2010 | Liu et al. |
| 2011/0105174 A1 | 5/2011 | Pelletier et al. |
| 2012/0082192 A1 | 4/2012 | Pelletier et al. |

OTHER PUBLICATIONS

3GPP TSG-RAN #62, Busan, Korea, RP-132078, Source: Ericsson, Title: "New Work Item Proposal: Further EUL Enhancements—Core", Document for: Approval, Agenda Item: 13.1.2, rev 20, Dec. 3-6, 2013 consisting of pp. 7-pages.

3GPP TSG-RAN #62, Busan, Korea, RP-132078, Source: Ericsson, Title: "New Work Item Proposal: Further EUL Enhancements", Document for: Approval, Agenda Item: 13.1.2, rev 30, Dec. 3-6, 2013 consisting of pp. 5-pages.

3GPP TR 25.700 V12.0.0 (Dec. 2013) Technical Report, 3rd Generation Partnership Project; Technical Specification Group Radio Access Network; Study on Further Enhanced Uplink (EUL) enhancements (Release 12) Jan. 7, 2014 consisting of 146-pages.

3GPP TSG-RAN WG1 #76, Prague, Czech Republic, R1-140810, Agenda Item: 6.4.1.3, Source: Ericsson, Title: "On Improving the Power Control After Long DTX on Secondary Carriers", Document for: Discussion and Decision, Feb. 10-14, 2014 consisting of pp. 4-pages.

3GPP TSG-RAN WG1 #77, Seoul, Korea, R1-142416, Agenda Item: 5.4.1, Source: Ericsson, Title: "Link Level Simulations on Improving the Power Control after DTX on Secondary Carriers," Document for Discussion May 18, 2014, consisting of 11 pages.

International Search Report and Written Opinion dated Sep. 9, 2015 for International Application No. PCT/SE2015/050326, International Filing Date Mar. 19, 2015 consisting of 11 pages.

International Preliminary Report on Patentability dated Jun. 17, 2016 for International Application No. PCT/SE2015/050326, International Filing Date Mar. 19, 2015 consisting of 11 pages.

SETTING INITIAL TRANSMISSION POWER FOR A SECONDARY CARRIER AFTER A TRANSMISSION GAP

TECHNICAL FIELD

Wireless communications and in particular, a method and device for improving power control for a secondary carrier after a transmission gap.

BACKGROUND

In recent years mobile operators have started to offer mobile wireless broadband communication service based on Third Generation Partnership Project (3GPP), e.g., Wideband Code Division Multiple Access (WCDMA). Further, fuelled by new devices designed for data applications, the end user performance requirements are steadily increasing. Moreover, the increased demand for mobile broadband service has resulted in traffic volumes being handled by high speed packet access (HSPA) enabled WCDMA networks.

Enhanced Uplink (EUL) was introduced in the 3GPP Rel-6 standard to improve HSPA performance. Since the uplink transmission from a wireless device to a base station is, by design, non-orthogonal, fast closed-loop power control is necessary to address the near-far problem, where a wireless device captures a strong signal from a nearby source, making it difficult to receive a weak signal from a source located further away. The base station, which may be referred to as a node B (NB) in a WCDMA network, measures the received signal-to-interference ratio (SIR) and sends power control commands in the downlink transmission from the NB to the wireless device e.g., user equipment (UE), to adjust the transmission power. Power control commands can be transmitted using a dedicated physical channel (DPCH) or, to save channelization codes, the fractional dedicated physical channel (F-DPCH). The non-orthogonality between wireless devices causes interference leakage between the wireless devices. As a result, the uplink throughput is often limited to 2-3 megabits per second (Mbps) in scenarios with multiple wireless devices.

To enable high-bitrate operation in a real-network environment it is necessary to isolate wireless devices using high-bitrate or high receive power from wireless devices that are vulnerable to the high interference created by the high-bitrate wireless devices, e.g., wireless devices engaged in voice communications, which require considerably lower receive power at the base station. One way to accomplish this within the current HSPA technology is to make use of a "clean carrier" concept. Briefly, in this concept, carriers are divided into regular carriers and clean carriers. The regular carriers provide the basic needs of a wireless device. The clean carriers are dedicated exclusively to high-bitrate transmissions. On a clean carrier, wireless devices are scheduled by the network to transmit one at a time by Time Division Multiplexing (TDM), as much as possible in order to avoid interfering with one another.

There are different methods for accomplishing this within the current, pre Rel-12 3GPP standard. One method is to make use of the Inter-Frequency Handover (IFHO) procedure and another method is to make use of the 3GPP Rel-9 Dual-Carrier high speed uplink packet access (HSUPA) feature (also known as Dual Cell enhanced dedicated channel (E-DCH) operation). In the 3GPP Rel-12 standard work item, in further enhanced uplink (EUL) enhancements, current various uplink improvements which can improve the HSPA performance are standardized. One of the sub-topics being discussed by the 3GPP standards entities is to enable high user bitrates in single and multi-carrier uplink mixed-traffic scenarios via enhancements to the existing Rel-7 continuous packet connectivity (CPC) and Rel-9 Dual-Carrier HSUPA features for a more efficient "clean carrier" operation.

In terms of power control, in the current CPC base line algorithm, whenever there is an interruption in the transmission, the power of the DPCCH is derived from the previous value that was used in the last slot before the transmission gap on the corresponding carrier. While the current standardized solution can be a good approach when the wireless device is dealing with short gaps, it can be highly inaccurate when dealing with long inactivity periods, since in those cases the channel would be completely uncorrelated. Since the channel could be completely uncorrelated between the transmissions when using the longest values defined for the current wireless device discontinuous transmission (DTX) cycle of 2 lengths (i.e., 32, 40, 64, 80, 128, 160 subframes), inheriting power from the previous transmission would require a longer re-establishment time for proper inner-loop power control.

Thus, while the power control according to the current standard can be effective for short gaps, the channel quickly gets uncorrelated after longer DTX periods, leading to longer re-establishment time for proper inner-loop power control.

SUMMARY

Embodiments described herein advantageously provide a method and system for setting an initial dedicated physical control channel (DPCCH) power of a secondary carrier after a transmission gap. According to one aspect, a method includes determining a filtered DPCCH power of first carrier. The method further includes determining a power offset. The method also includes calculating the initial DPCCH power of the secondary carrier by adding the determined filtered DPCCH power of the first carrier to the determined power offset.

According to this aspect, in some embodiments, the first carrier is a primary carrier. In some embodiments, determining the filtered value of DPCCH power of the first carrier includes determining filtered power of a combination of the secondary carrier and a primary carrier. In some embodiments, the power offset is based at least in part on a difference between a target signal to interference ratio (SIR) of the secondary carrier and a target SIR of the first carrier. In some embodiments, the power offset is based at least in part on a difference between signal to interference ratios associated with different data transmission rates. In some embodiments, the power offset is based at least in part on a difference between a rise over thermal noise (RoT) of the primary and secondary carrier. In some embodiments, the calculating is controlled by a higher layer that determines whether to set the initial DPCCH power of the secondary carrier to a same power as a last transmission of the DPCCH. In some embodiments, the determination whether to set the initial DPCCH power of the secondary carrier to the same power as the last transmission of the DPCCH is based on a duration of the transmission gap. In some embodiments, the determined filtered value of DPCCH power of the first carrier is determined according to a first order discrete filter. In some embodiments, the first order discrete filter is given by:

$$P_{DPCCH,ref}(i)=(1-\alpha)\cdot P_{DPCCH,ref}(i-1)+\alpha\cdot P_{DPCCH}(i)$$

where $P_{DPCCH,ref}$ is the determined filtered DPCCH power of the first carrier, $P_{DPCCH}(i)$ is the i th slot primary carrier DPCCH power, α is a configurable filter coefficient, and i is a sample index. In some embodiments, the first order discrete filter is given by:

$$P_{DPCCH,ref}(i)=\alpha \cdot P_{DPCCH,ref}(i-1)+(1-\alpha)\cdot P_{DPCCH}(i)$$

where $P_{DPCCH,ref}$ is the determined filtered DPCCH power of the first carrier, $P_{DPCCH}(i)$ is the i th slot primary carrier DPCCH power, α is a configurable filter coefficient, and i is a sample index. In some embodiments, α is dependent upon a Doppler shift.

According to another aspect, embodiments include a method to assist setting of an initial dedicated physical control channel, DPCCH, power of a secondary carrier after a transmission gap. A filter coefficient (20) to be used by a wireless device (18) to determine a filtered DPCCH power of a first carrier is determined. The filter coefficient (20) is signaled to the wireless device.

According to another aspect, embodiments include a network node configured to assist setting of an initial dedicated physical control channel, DPCCH, power of a secondary carrier after a transmission gap. The network node includes a processor, a memory and a transmitter. The memory is configured to contain instructions executable by the processor to configure the processor to determine the filter coefficient to be used by a wireless device to determine a filtered DPCCH power of a first carrier. The transmitter is configured to signal the filter coefficient to the wireless device.

According to this aspect, in some embodiments, the memory is further configured to contain instructions executable by the processor to configure the processor to determine the power offset to be used by the wireless device to calculate the initial DPCCH power of the secondary carrier by adding the filtered DPCCH power of the first carrier to the determined power offset. In some embodiments, the network node is a radio network controller, RNC. In some embodiments, the filter coefficient, α, is signaled to a base station in communication with the wireless device via a signaling protocol between the network node and the base station. In some embodiments, the memory is further configured to store a filter coefficient, α.

According to yet another aspect, embodiments include a network node configured to assist setting of an initial dedicated physical control channel (DPCCH) power of a secondary carrier after a transmission gap. The network node includes a filter coefficient module configured to determine a filter coefficient to be used by a wireless device to determine a filtered DPCCH power of a first carrier. The network node further includes a transmitter module configured to signal the filter coefficient to the wireless device.

According to this aspect, in some embodiments, the network node further includes a power offset module configured to determine a power offset to be used by the wireless device to calculate the initial DPCCH power of the secondary carrier by adding the filtered DPCCH power of the first carrier to the determined power offset. In some embodiments, the network node is one of a radio network controller, RNC, and a Node B.

According to another aspect, embodiments include a wireless device configured to set an initial dedicated physical control channel (DPCCH) power of a secondary carrier after a transmission gap. The wireless device includes a processor and a memory. The memory is configured to store a filtered DPCCH power and a power offset. The memory is further configured to contain instructions executable by the processor to configure the processor to: determine the filtered DPCCH power and calculate the initial DPCCH power of the secondary carrier based on the determined filtered DPCCH power of the first carrier.

According to this aspect, in some embodiments, the first carrier is a primary carrier. In some embodiments, determining the filtered value of DPCCH power (24) of the first carrier includes determining filtered power of a combination of the secondary carrier and a primary carrier. In some embodiments, the power offset (22) is based at least in part on a difference between a target signal to interference ratio, SIR, of the secondary carrier and a target SIR of the first carrier. In some embodiments, the power offset (22) is based at least in part on a difference between signal to interference ratios, SIR, associated with different data transmission rates. In some embodiments, the power offset (22) is based at least in part on a difference between a rise over thermal noise, RoT, of the primary and secondary carrier. In some embodiments, the determined filtered DPCCH power (24) of the first carrier is determined according to a first order discrete filter (60). In some embodiments, a filter configured to filter the DPCCH power of the first carrier is given by:

$$P_{DPCCH,ref}(i)=(1-\alpha)P_{DPCCH,ref}(i-1)+\alpha \cdot P_{DPCCH}(i)$$

where $P_{DPCCH,ref}$ is the determined filtered DPCCH power of the first carrier, $P_{DPCCH}(i)$ is the i th slot primary carrier DPCCH power, α is a configurable filter coefficient, and i is a sample index. In some embodiments, the filter configured to filter the DPCCH power of the first carrier is given by:

$$P_{DPCCH,ref}(i)=\alpha \cdot P_{DPCCH,ref}(i-1)+(1-\alpha)\cdot P_{DPCCH}(i)$$

where $P_{DPCCH,ref}$ is the determined filtered DPCCH power of the first carrier, $P_{DPCCH}(i)$ is the i th slot primary carrier DPCCH power, α is a configurable filter coefficient, and i is a sample index. In some embodiments, the filter coefficient α (26) is dependent upon a Doppler shift.

According to another aspect, embodiments include a wireless device configured to set an initial dedicated physical control channel, DPCCH, power of a secondary carrier after a transmission gap. The wireless device includes a filter module configured to determine a filtered DPCCH power of a first carrier based on a filter coefficient, α, received from a base station. The wireless device also includes a receiver module configured to receive the filter coefficient, α, from the base station. The wireless device further includes a calculator module configured to calculate the initial DPCCH power of the secondary carrier based on the determined filtered DPCCH power of the first carrier.

According to this aspect, in some embodiments, the calculator module is further configured to calculate the initial DPCCH power of the secondary carrier by adding a power offset to the determined filtered DPCCH power of the first carrier. In some embodiments, the first carrier is a primary carrier. In some embodiments, a filter configured to filter the DPCCH power of the first carrier is given by:

$$P_{DPCCH,ref}(i)=\alpha \cdot P_{DPCCH,ref}(i-1)+(1-\alpha)\cdot P_{DPCCH}(i)$$

where $P_{DPCCH,ref}$ is the determined filtered DPCCH power of the primary carrier $P_{DPCCH}(i)$ is the i th slot primary carrier DPCCH power, and α is a configurable filter coefficient. In some embodiments, a filter configured to filter the DPCCH power of the first carrier is given by:

$$P_{DPCCH,ref}(i)=(1-\alpha)\cdot P_{DPCCH,ref}(i-1)+\alpha \cdot P_{DPCCH}(i)$$

where $P_{DPCCH,ref}$ is the determined filtered DPCCH power of the primary carrier $P_{DPCCH}(i)$ is the i th slot primary carrier DPCCH power, and α is a configurable filter coefficient. In some embodiments, α is dependent upon a Doppler shift.

BRIEF DESCRIPTION OF THE DRAWINGS

A more complete understanding of the embodiments described herein, and the attendant advantages and features thereof, will be more readily understood by reference to the following detailed description when considered in conjunction with the accompanying drawings wherein.

DETAILED DESCRIPTION

Figure 1:
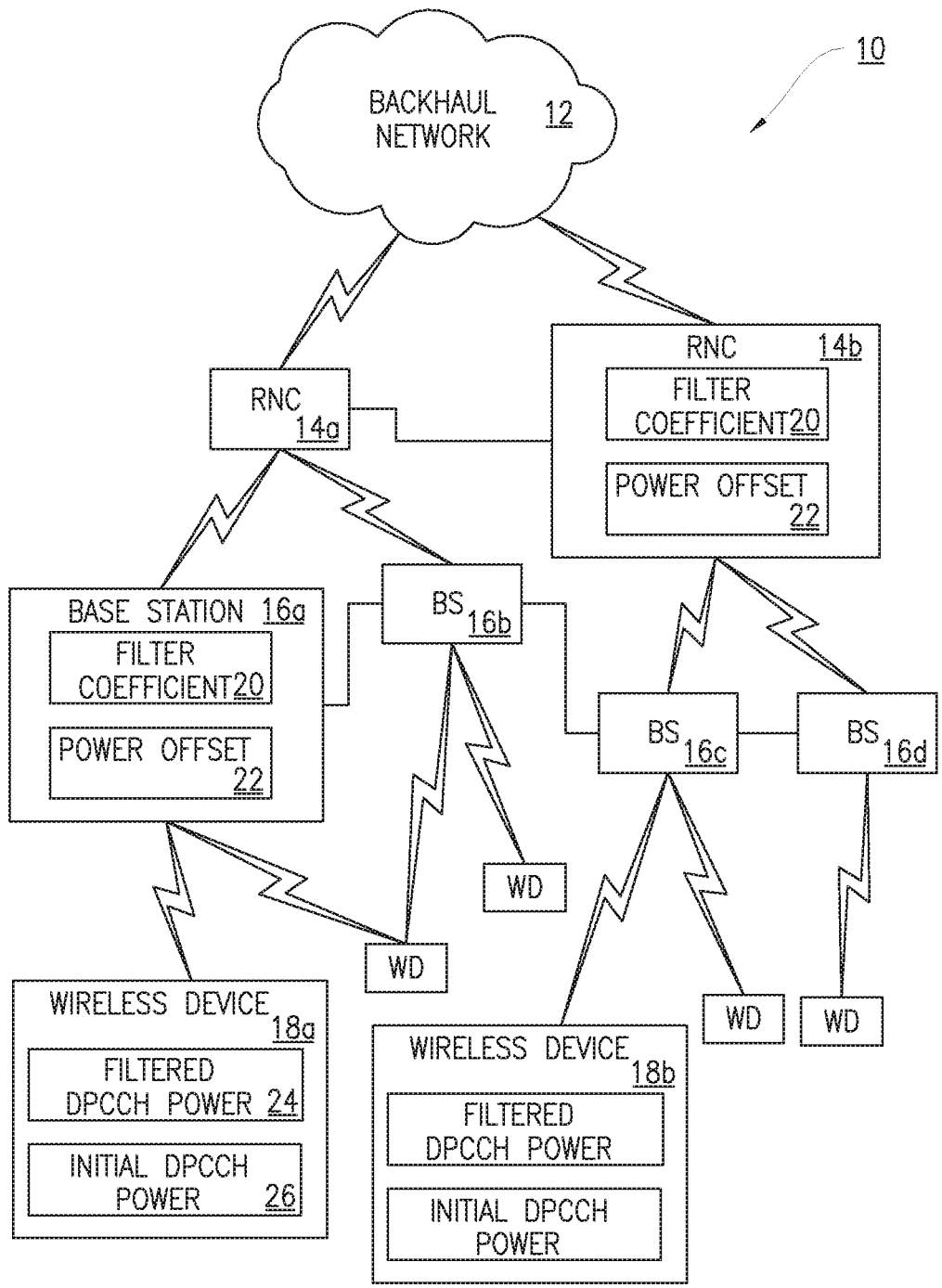
FIG. 1 is a block diagram of a wireless communication system having capability to set an initial transmission power of a secondary carrier after a transmission gap.

Before describing in detail exemplary embodiments, it is noted that the embodiments reside primarily in combinations of apparatus components and processing steps related to for improving power control for a secondary carrier after a transmission gap. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Note that although terminology from 3GPP HSPA has been used in this disclosure to exemplify the embodiments, this should not be seen as limiting the scope of the embodiments to only the aforementioned system. Other wireless systems, including LTE, LTE-A, WiMax, ultra-mobile broadband (UMB) and global system for mobile communications (GSM), may also benefit from applying embodiments discussed herein.

Also note that terminology such as NodeB or eNB and UE should be considering non-limiting and does not imply a certain hierarchical relation between the two; in general "NodeB" could be considered as device 1 and "UE" device 2, and these two devices communicate with each other over some radio channel. Also, a UE is just one embodiment of a wireless device served by a base station.

An algorithm is provided for setting the initial power of the secondary carrier after a long transmission gap. In some embodiments, the initial power is set to be a sum of a reference power and a power offset. The reference power can be a filtered value based on previous DPCCH power levels on either the primary or the secondary carrier. The filter can have one or more coefficients configurable by higher layers. The applied power offset can also be configurable by higher layers. As used herein, a "higher layer" means layer higher than open systems interconnection (OSI) layer 1. The power offset and filter coefficients can be signaled from a base station to a UE using control plane signaling, for example.

Solutions described herein give improved performance in chatty smartphone traffic or for high user bitrates in single and multi-carrier uplink mixed-traffic scenarios as compared with the current approach of using the power of the last transmission before a DTX transmission gap to determine the power of the first transmission after the DTX transmission gap. The longer the interruptions between transmission and the shorter the active transmission, the greater the benefits of solutions described herein. The currently available or previously disclosed power control mechanisms are good in certain cases as short transmission gaps or shadow fading dominated channels.

Accordingly, an algorithm for the initial DPCCH power setting is described below. With this algorithm, the initial power of the secondary carrier after a transmission gap is set to be a sum of a reference power and a power offset, i.e., $$P_{DPCCH}=P_{DPCCH,ref}+UE\_Sec\_Tx\_Power\_Offse \quad (1)$$

Here, $P_{DPCCH}$ is the initial DPCCH power of the secondary carrier after a transmission gap, and the power offset, UE_Sec_Tx_Power_offset, is configurable and may be set by higher layers. The $P_{DPCCH,ref}$ is a filtered DPCCH power taken from a primary carrier as:

$$P_{DPCCH,ref}(i)=\alpha \cdot P_{DPCCH,ref}(i-1)+(1-\alpha)\cdot P_{DPCCH}(i) \quad (2)$$

where $P_{DPCCH}(i)$ corresponds to the i th slot primary carrier DPCCH power, and α is a configurable filter coefficient. Equation 2 can be alternatively expressed as:

$$P_{DPCCH,ref}(i)=(1-\alpha)\cdot P_{DPCCH,ref}(i-1)+\alpha \cdot P_{DPCCH}(i) \quad (3)$$

where $P_{DPCCH,ref}$ is the determined filtered DPCCH power of the first carrier, α is a configurable filter coefficient, and i is a sample index, and where a in equation 2 is equal to 1−α in equation 3. Thus, equations 2 and 3 are equivalent.

The filter coefficient, α, and the offset that is used may need to be signaled to the wireless device, e.g., via radio resource control (RRC), or a high speed (HS) order, from a base station serving the wireless device. Thus, the proposed solution includes using the filtered power together with an offset after a transmission gap. The filtered power may be one of:

Filtered Primary DPCCH to provide power reference for secondary DPCCH after a transmission gap on secondary;

Filtered Secondary DPCCH to provide power reference for secondary DPCCH after a transmission gap on secondary; and Filtered Primary DPCCH to provide power reference for primary DPCCH after a transmission gap on primary.

In some embodiments, the filtering may be performed with a filter coefficient, α, that depends on a Doppler shift of the primary carrier. The power offset can be related to expected SIR target differences between data transmission rates. A higher layer may be able to control if the power after the transmission gap is set to the filtered DPCCH power or the same power as the last transmission power before the gap. In some embodiments, the higher layer may be able to control if the power offset is added or not. In some embodiments, the reference power which is subject to filtering can be taken from secondary carrier previous transmissions, or from both secondary and primary carriers, depending on the transmission gap length. In such case, the $P_{DPCCH,ref}$ is a filtered DPCCH power taken from a secondary carrier as:

$$P_{DPCCH,ref}(i)\alpha\text{-}P_{DPCCH,ref\_s}(i-1)+(1-\alpha)\cdot P_{DPCCH\_s}(i) \qquad (4)$$

where $P_{DPCCH\_s}(i)$ corresponds to the i th slot secondary carrier DPCCH power, and $\alpha$ is a configurable filter coefficient.

Thus, the UE may filter the transmission power on both the primary and secondary carrier. The transmission gap may determine which filtered power to use when calculating the initial power of the DPCCH of the secondary carrier. For example, when a transmission on the secondary carrier is to be initiated after a transmission gap, the duration of the gap may be compared to a threshold. If the gap duration is below a threshold, the filtered power of the secondary carrier is used as the initial power. If the gap is above a threshold, the filtered power from the primary carrier or a combination of filtered power of the primary carrier and second carrier may be used as the initial power. Thus, if the gap duration is short, then using the filtered power of the secondary carrier only will be more beneficial because the radio channel will still have some correlation. But if the gap duration is long, then using the both primary and secondary carrier filtered power is expected to provide better performance because the primary carrier may better track an average path loss.

FIG. 1 is a block diagram of an example of a wireless communication system 10 that implements the power control functionality described herein. The wireless communication system 10 may include a backhaul network 12 that includes the public switched telephone network (PSTN) and/or the Internet. In communication with the backhaul network 12 are one or more radio network controllers (RNC) 14a and 14b, referred to collectively herein as RNCs 14. The RNCs 14 are in communication with one or more base stations 16a-16d, referred to collectively herein as base stations 16. Each base station 16 may be in communication with one or more wireless devices such as wireless devices 18a and 18b, referred to collectively herein as wireless devices 18.

In some embodiments, the filter coefficient, $\alpha$, of the filter of equation 2 or 3 can be stored in an RNC 14 such as RNC 14b as filter coefficient 20. From the RNC 14b, the filter coefficient, $\alpha$, 20 can be signaled to a wireless device 18 via a base station 16. Similarly, the power offset UE_Sec_Tx_Power_offset 22 can be stored in the RNC 14 and signaled to the wireless device 18 via a base station 16. Alternatively, or in addition, the filter coefficient, $\alpha$, 20 and the power offset 22 can be stored in a base station 16 such as base station 16a, and signaled to a wireless device 18, such as to wireless device 18a. A wireless device 18, such as wireless device 18a or 18b, may be equipped with a processor and a memory to compute and store a filtered DPCCH power 24 and an initial DPCCH power 26 of a secondary carrier.

Figure 2:
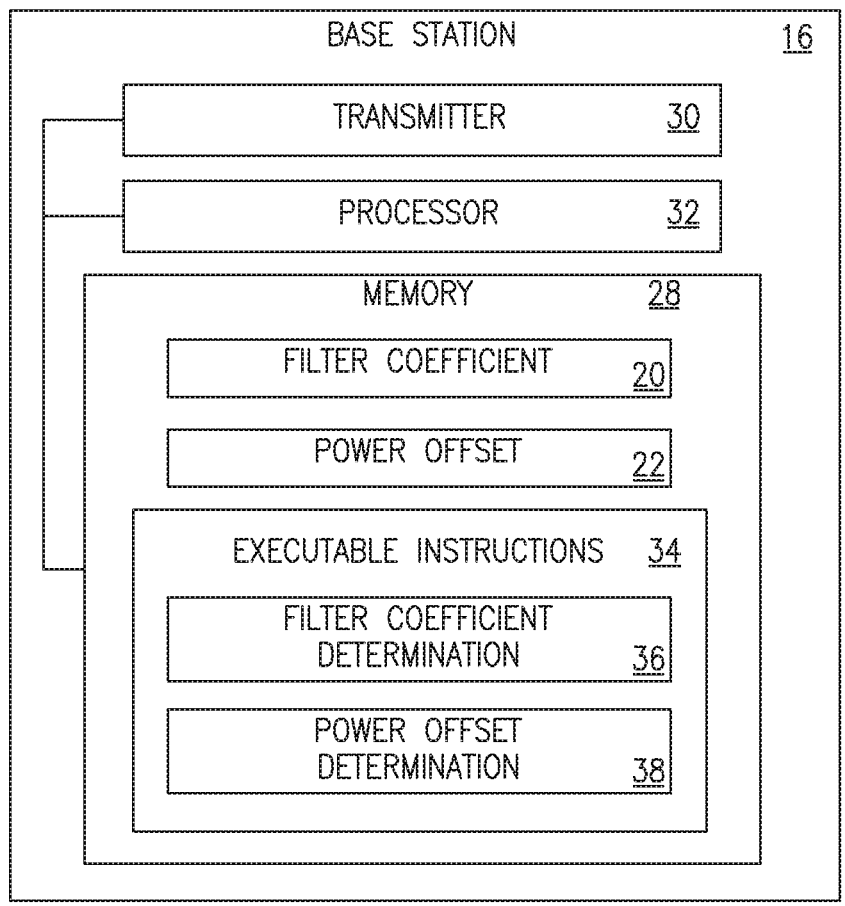
FIG. 2 is a block diagram of a base station configured to store one or more filter coefficients and one or more power offsets.

FIG. 2 is a block diagram of a base station 16 such as base station 16a that has a memory 28 stores a filter coefficient 20 and a power offset 22. A base station 16 can be an eNB in an LTE network or an NB in a WCDMA network. Note that in some embodiments, more than one filter coefficient and more than one power offset may be stored. For example, a second order filter may be implemented with two filter coefficients. Thus, embodiments are not limited to the single filter coefficient, $\alpha$, and the filter described by equations 2 or 3. The base station also has a transmitter 30 to signal the filter coefficient(s) 20 and power offset(s) 22 to a wireless device such as wireless device 18. The base station also has a processor 32 for executing executable instructions 34 to perform functions of filter coefficient determination 36 and power offset determination 38. The filter coefficient determination function 36 determines the filter coefficient 20 to be used by the wireless device 18 to determine a filtered DPCCH power of a reference signal or first carrier. The power offset determination function 38 determines the power offset to be used by the wireless device 18 to calculate the initial DPCCH power of the secondary carrier by adding the filtered DPCCH power of the first carrier to the determined power offset.

Selection of the filter coefficient may be based on whether filtering is to be performed on the primary carrier or the secondary carrier. When filtering the primary carrier, a long averaging time length may be preferred. When filtering the secondary carrier, the coefficient may be dependent on the Doppler frequency if the gap is short. If the gap is long, a longer averaging time may be more beneficial. In some embodiments, the power offset is based at least in part on a difference between a target signal to interference ratio (SIR) of the secondary carrier and a target SIR of the first carrier as follows:

$$\text{Power Offset}=\text{SIRtarget},sec-\text{SIRtarget},pri$$

In some embodiments, the power offset is based at least in part on a difference between signal to interference ratios associated with different data transmission rates. Different transmission rates on the primary and secondary carrier will result in different target signal to interference ratios, which in turn result in different power levels on the DPCCH. The power offset is selected to compensate for the power difference on the DPCCH between the two carriers, which is associated with data rate. In some embodiments, the power offset may depend on a rise over thermal noise (RoT) measurement on the primary and secondary carrier.

Figure 3:
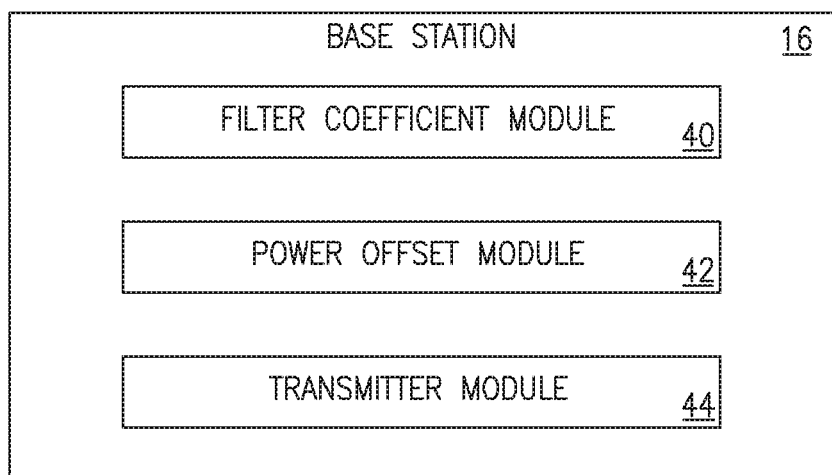
FIG. 3 is a block diagram of a base station organized into modules.

FIG. 3 is an embodiment of the base station 16 organized as modules, which may include software modules executable by a processor. A filter coefficient module 40, when executed by the processor, configures the processor to determine a filter coefficient to be used by a wireless device to determine a filtered DPCCH power of a first carrier. A power offset module 42, when executed by the processor, configures the processor to determine a power offset to be used by the wireless device to calculate the initial DPCCH power of the secondary carrier by adding the filtered DPCCH power of the first carrier to the determined power offset. A transmitter module 44 is configured to signal the filter coefficient and the power offset to the wireless device 18.

Figure 4:
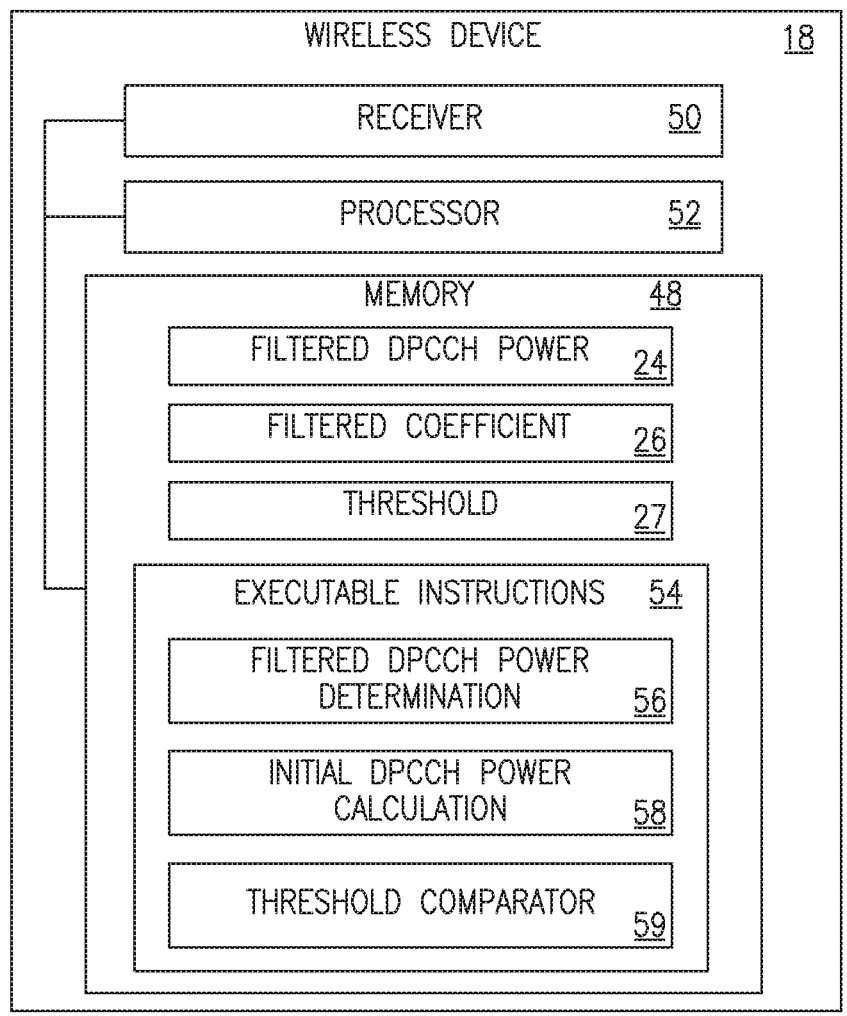
FIG. 4 is a block diagram of a wireless device configured to set an initial transmission power of a secondary carrier after a transmission gap.

FIG. 4 is a block diagram of a wireless device 18 configured to set an initial dedicated physical control channel (DPCCH) power of a secondary carrier after a transmission gap. The wireless device 18 includes a memory 48 that is configured to store a filtered DPCCH 24 and a filter coefficient 26. In some embodiments the memory 48 may possibly also be configured to store a threshold 27. The filter coefficient 26 may be the filter coefficient 20 received from the base station 16 by a receiver 50 of the wireless device 18. A processor 52 executes executable instructions 54 to perform functions of a filtered DPCCH power determination 56, an initial DPCCH power calculation 58, and optionally a threshold comparator 59. The filtered DPCCH power determination function 56 may determine the filtered DPCCH power of a first carrier based on a filter coefficient, α, signaled from a base station 16. The filtering of the DPCCH power can be performed according to the filtering described by equation 2 or 3 above. The initial DPCCH power calculation function 58 calculates the initial DPCCH power of the secondary carrier based on the determined filtered DPCCH power of the first carrier, according to equations 1 and 2 or 1 and 3 above. In some embodiments, the optional threshold comparator 59 may compare a transmission gap duration to the threshold 27 to determine whether to base the initial DPCCH power of the secondary carrier on the filtered DPCCH power of the first carrier or on the previous power of the secondary carrier before the transmission gap.

Figure 5:
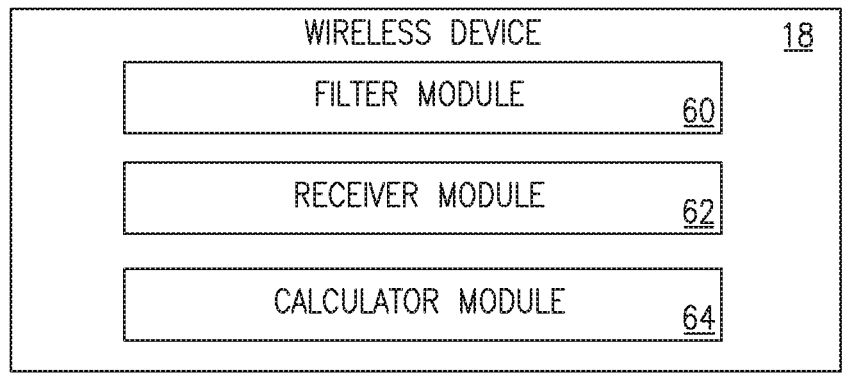
FIG. 5 is a block diagram of a wireless device organized into modules.

FIG. 5 is an embodiment of the wireless device 18 organized as modules, which may include software modules executable by a processor. A filter module 60 contains executable instructions that, when executed by a processor, configure the processor to determine a filtered DPCCH power of a first carrier. In some embodiments. the determination of the filtered DPPCH may be based on a filter coefficient, α, received from a base station. The filter coefficient, α, may be received from the base station 16 via a receiver module 62. A calculator module 64 is configured to calculate the initial DPCCH power of the secondary carrier based on the determined filtered DPCCH power of the first carrier. In particular, the calculator module 64 may be configured to calculate the initial DPCCH power of the secondary carrier by adding a power offset to the determined filtered DPCCH power of the first carrier. In some embodiments, the first carrier is a primary carrier. Note that in an alternative embodiment, filtering can be applied to the secondary carrier DPCCH to determine the primary or secondary carrier initial transmission after a transmission gap.

Figure 6:
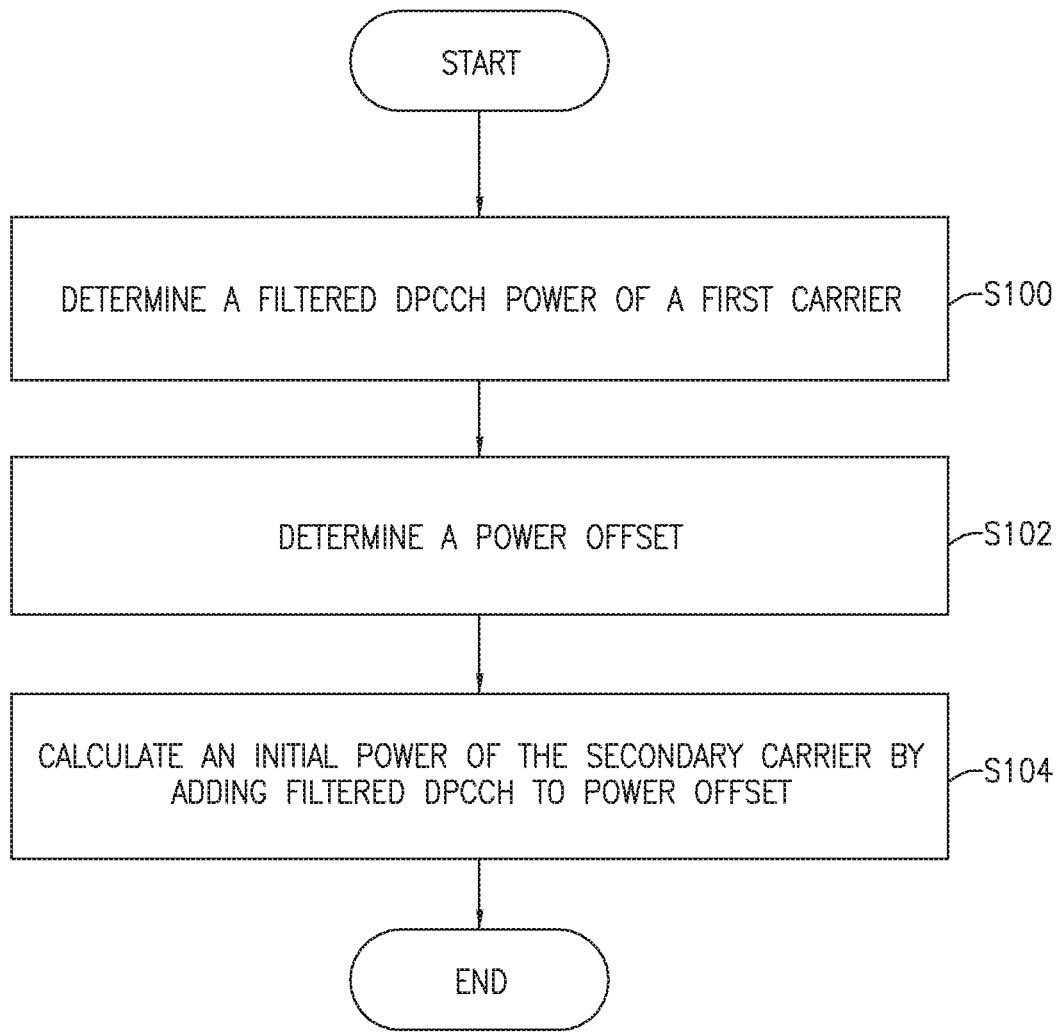
FIG. 6 is a flowchart of an exemplary process for setting an initial transmission power of a secondary carrier after a transmission gap.

FIG. 6 is a flowchart of an exemplary process for setting an initial dedicated physical control channel, DPCCH, power of a secondary carrier after a transmission gap. A filtered DPCCH power of a first carrier is determined (block S100) according to executable instructions for filtered DPCCH power determination 56. For example, the determining of the filtered value of DPCCH power of the first carrier may include determining filtered power of a combination of the secondary carrier and a primary carrier. A power offset is also determined (block S102) according to methods described above. An initial power of the secondary carrier is calculated by adding the filtered DPCCH power to the power offset (block S104) according to executable instructions for initial DPCCH power calculation 58. Whether to set the initial DPCCH power of the secondary carrier to a same power as a last transmission of the DPCCH may be based on a duration of the transmission gap, as explained with reference to FIG. 7.

Figure 7:
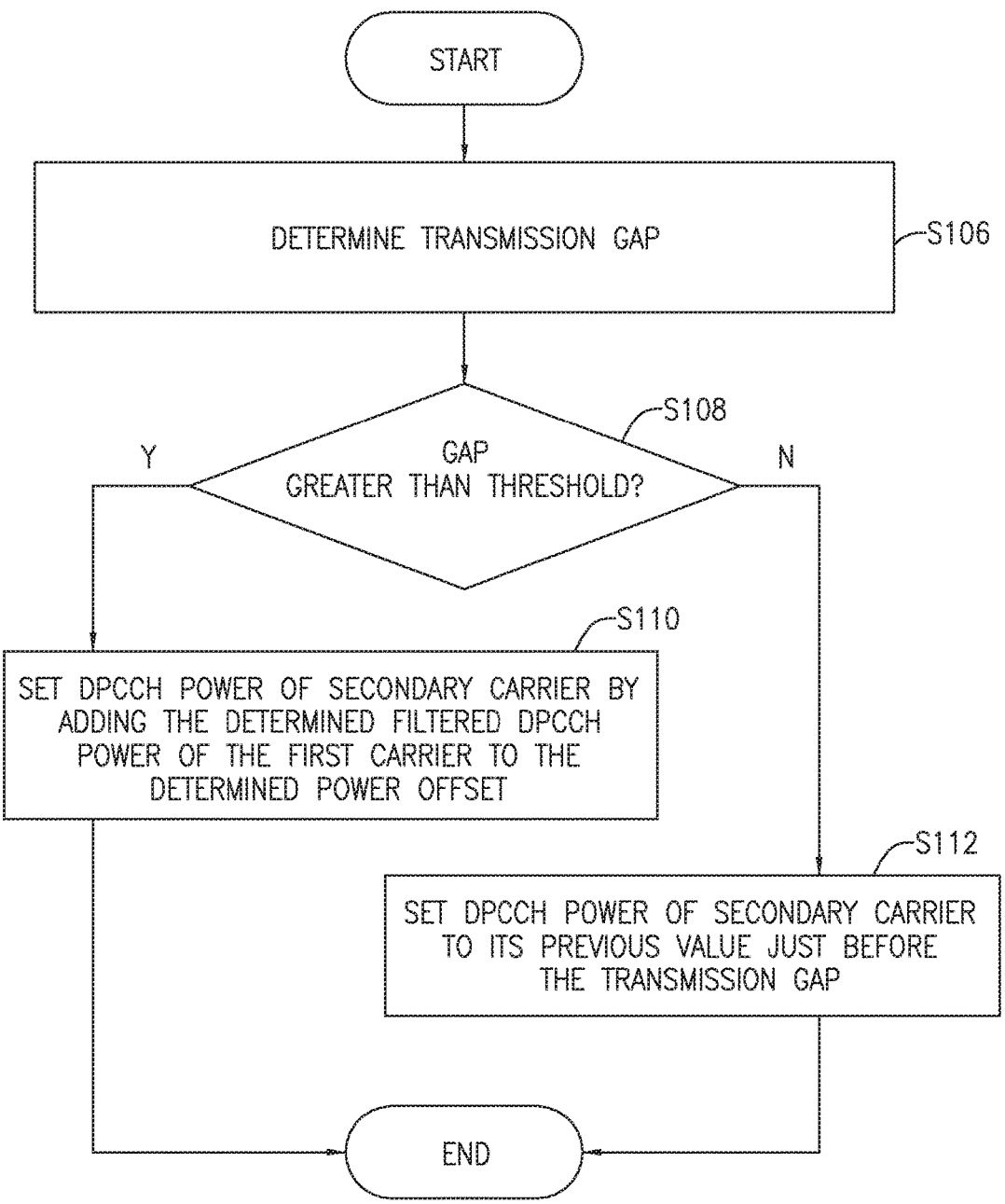
FIG. 7 is a flowchart of an exemplary process for determining how to set an initial transmission power of a secondary carrier after a transmission gap.

FIG. 7 is a flowchart of an exemplary process performed by a wireless device for conditionally determining a secondary carrier transmission power after a transmission gap. The duration of the transmission gap between successive transmissions is determined (block S106). The transmission gap duration is compared to the threshold 27 (block S108) according to the executable instructions for the threshold comparator 59. If the transmission gap duration exceeds the threshold, the DPCCH power of the secondary carrier is set by adding the filtered DPCCH power of the first carrier (reference signal) to the determined power offset (block S110) according to the executable instructions for initial DPCCH power calculation 58. If the transmission gap duration does not exceed the threshold, the DPCCH power of the secondary carrier is set to its previous value just before the start of the transmission gap (block S112).

Figure 8:
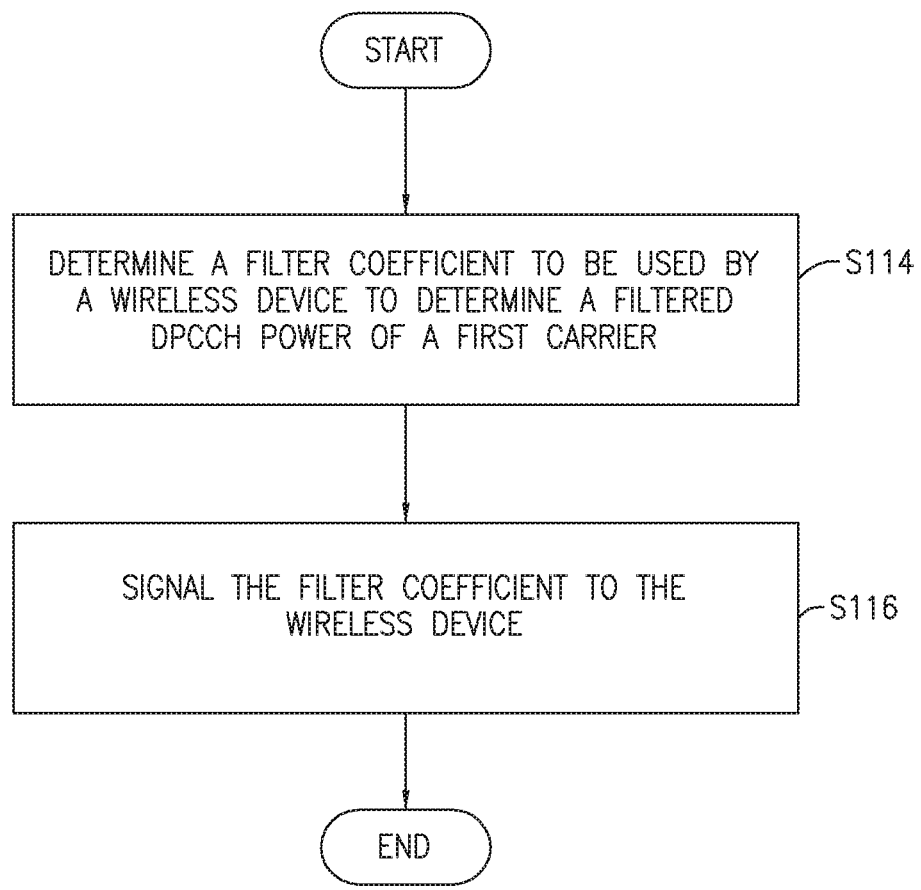
FIG. 8 is a flowchart of an exemplary process for determining a filter coefficient at a base station and signaling the filter coefficient to a wireless device.

FIG. 8 is a flowchart of an exemplary process performed by a base station to assist setting of an initial DPCCH power of a secondary carrier after a transmission gap at a wireless device. A filter coefficient to be used by the wireless device to determine a filtered DPCCH power of a first carrier is determined (block S114). The filter coefficient is signaled to the wireless device (block S116).

To evaluate the proposed algorithm, link simulations have been performed. In the simulations, the wireless device has a continuous transmission on the primary carrier with a user rate of 160 kbps and a fixed block error rate (BLER) performance around 2%. On the secondary carrier, the wireless device has a bursty transmission with fixed DTX cycle lengths. At each transmission, the wireless device transmits two transmission time intervals (TTIs) of enhanced dedicated channel (E-DCH) data. Given that the secondary carrier is aimed for bursty traffic, a short preamble length would be preferred in order to avoid problems such as latency and scheduling complexity introduced by using long preambles. Thus, a 2-slot preamble is used for the link simulation.

Based on such simulations, a slow filter with α=0.999, for example, provides clear performance improvement over a continuous packet connectivity (CPC) baseline, such as the CPC baseline algorithm discussed above. Also observable from simulations is that using the power level of an unfiltered primary carrier to determine the secondary carrier DPCCH initial power gives poorer performance than the CPC baseline. Note that performance differences between the first and second TTI after transmission gap may still be present. Improvement of the BLER in the first TTI is relatively larger than the improvement of the BLER in the second TTI, especially for cases of higher rate used by a wireless device, i.e., 10 Mbps. The methods described herein show increased improvement for longer transmission gaps, for example, 20 subframes and above.

Embodiments described herein can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. Embodiments can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method of setting an initial dedicated physical control channel (DPCCH) power of a secondary carrier after a transmission gap, the method comprising:
   determining a reference DPCCH power;
   determining a power offset; and
   calculating the initial DPCCH power of the secondary carrier by adding the determined reference DPCCH power to the determined power offset.

2. The method of claim 1, wherein determining the reference DPCCH power includes determining a power of a combination of the secondary carrier and a primary carrier.

3. The method of claim 1, wherein the power offset is based at least in part on a difference between a target signal to interference ratio (SIR) of the secondary carrier and a target SIR of a first carrier.

4. The method of claim 1, wherein the power offset is based at least in part on a difference between signal to interference ratios (SIR) associated with different data transmission rates.

5. The method of claim 1, wherein the power offset is based at least in part on a difference between a rise over thermal noise (RoT) of a primary and the secondary carrier.

6. The method of claim 1, wherein the determined reference DPCCH power is determined according to a first order discrete filter.

7. The method of claim 1, wherein the initial DPCCH power of the secondary carrier ($P_{DPCCH}$) is determined by $P_{DPCCH} = P_{DPCCH,ref} + UE\_Sec\_Tx\_Power\_Offset$,
   where $P_{DPCCH,ref}$ is the reference DPCCH power and UE_Sec_Tx_Power_Offset is the determined power offset.

8. The method of claim 1, wherein the determined reference power is a filtered value based on at least one previous DPCCH power level of one of a primary or the secondary carrier.

9. The method of claim 1, wherein the power offset is configurable and is set by a communication layer higher than open systems interconnection (OSI) layer 1.

10. A network node configured to assist setting of an initial dedicated physical control channel (DPCCH) power of a secondary carrier after a transmission gap, the network node comprising:
    a processor;
    a memory configured to contain instructions executable by the processor to configure the processor to:
       determine a filter coefficient to be used by a wireless device to determine a reference DPCCH power; and
    a transmitter configured to signal the filter coefficient to the wireless device.

11. The network node of claim 10, wherein the memory is further configured to:
    contain instructions executable by the processor to configure the processor to:
       determine the power offset to be used by the wireless device to calculate the initial DPCCH power of the secondary carrier.

12. The network node of claim 10, wherein the network node is one of a radio network controller (RNC) and a Node B.

13. The network node of claim 12, wherein the filter coefficient is signaled to a base station in communication with the wireless device via a signaling protocol between the network node and the base station.

14. The network node of claim 10, wherein the memory is further configured to store the filter coefficient.

15. A wireless device configured to set an initial dedicated physical control channel (DPCCH) power of a secondary carrier after a transmission gap, the wireless device comprising:
    a processor; and
    a memory configured to store:
       a reference DPCCH power;
       the memory further configured to contain instructions executable by the processor to configure the processor to:
          determine the reference DPCCH power;
          determine a power offset; and
          calculate the initial DPCCH power of the secondary carrier by adding the determined reference DPCCH power to the determined power offset.

16. The wireless device of claim 15, wherein determining the reference DPCCH power includes determining a power of a combination of the secondary carrier and a primary carrier.

17. The wireless device of claim 15, wherein the power offset is based at least in part on a difference between a target signal to interference ratio (SIR) of the secondary carrier and a target SIR of a first carrier.

18. The wireless device of claim 15, wherein the power offset is based at least in part on a difference between signal to interference ratios (SIR) associated with different data transmission rates.

19. The wireless device of claim 15, wherein the power offset is based at least in part on a difference between a rise over thermal noise (RoT) of a primary and the secondary carrier.

20. The wireless device of claim 15, wherein the determined reference DPCCH power is determined according to a first order discrete filter.

21. The wireless device of claim 15, wherein the initial DPCCH power of the secondary carrier ($P_{DPCCH}$) is determined by $P_{DPCCH} = P_{DPCCH,ref} + UE\_Sec\_Tx\_Power\_Offset$,
    where $P_{DPCCH,ref}$ is the reference DPCCH power and UE_Sec_Tx_Power_Offset is the determined power offset.

22. The wireless device of claim 15, wherein the determined reference power is a filtered value based on at least one previous DPCCH power level of one of a primary or the secondary carrier.

23. The wireless device of claim 15, wherein the power offset is configurable and is set by a communication layer higher than open systems interconnection (OSI) layer 1.

* * * * *

UNITED STATES PATENT AND TRADEMARK OFFICE
CERTIFICATE OF CORRECTION

PATENT NO. : 9,756,584 B2  
APPLICATION NO. : 15/360380  
DATED : September 5, 2017  
INVENTOR(S) : Konuskan et al.

Page 1 of 2

It is certified that error appears in the above-identified patent and that said Letters Patent is hereby corrected as shown below:

On the Title Page

In Item (56), under "OTHER PUBLICATIONS", in Column 2, Line 4, delete "of pp." and insert -- of --, therefor.

On Page 2, in Item (56), under "OTHER PUBLICATIONS", in Column 2, Line 4, delete "of pp." and insert -- of --, therefor.

On Page 2, in Item (56), under "OTHER PUBLICATIONS", in Column 2, Line 8, delete "of pp." and insert -- of --, therefor.

On Page 2, in Item (56), under "OTHER PUBLICATIONS", in Column 2, Line 16, delete "of pp." and insert -- of --, therefor.

In the Specification

In Column 4, Line 24, delete "$P_{DPCCH,ref}(i)=(1-\alpha)P_{DPCCH,ref}(i-1)+\alpha \cdot P_{DPCCH}(i)$" and insert -- $P_{DPCCH,ref}(i)=(1-\alpha) \cdot P_{DPCCH,ref}(i-1)+\alpha \cdot P_{DPCCH}(i)$ --, therefor.

In Column 4, Line 37, delete "coefficient α" and insert -- coefficient, α, --, therefor.

In Column 6, Line 32, delete "$P_{DPCCH}=P_{DPCCH,ref}+UE\_Sec\_Tx\_Power\_Offse$" and insert -- $P_{DPCCH}=P_{DPCCH,ref}+UE\_Sec\_Tx\_Power\_Offset$ --, therefor.

In Column 6, Line 47, delete "a in" and insert -- α in --, therefor.

On Column 7, Line 11, delete "$P_{DPCCH,ref}(i)\alpha-P_{DPCCH,ref\_s}(i-1)+(1-\alpha) \cdot P_{DPCCH\_s}(i)$" and insert -- $P_{DPCCH,ref}(i)=\alpha \cdot P_{DPCCH,ref\_s}(i-1)+(1-\alpha) \cdot P_{DPCCH\_s}(i)$ --, therefor.

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,756,584 B2

In Column 7, Lines 51-52, delete "offset UE_Sec_TX_Power_offset" and insert -- offset, UE_Sec_TX_Power_offset, --, therefor.

In Column 9, Line 21, delete "embodiments." and insert -- embodiments, --, therefor.

In Column 9, Line 22, delete "DPPCH" and insert -- DPCCH --, therefor.